United States Patent
Chandramouli et al.

(10) Patent No.: US 12,401,622 B1
(45) Date of Patent: Aug. 26, 2025

(54) GENERATING A PLAN FOR ROUTING UPDATES FOR DISCOVERED RESOURCES AT NETWORKS WITH DEPLOYED FIREWALLS

(71) Applicant: Amazon Technologies, Inc., Seattle, WA (US)

(72) Inventors: Shridharan Chandramouli, Newcastle, WA (US); Andrew Chen, Bellevue, WA (US); Adhish Bhobe, Sammamish, WA (US); Shuaijie Wang, Bellevue, WA (US); Maritza Mills, Reston, VA (US); Siman Huang, Bellevue, WA (US); Yi-Ting Chen, Seattle, WA (US); Xiangpeng Li, Redmond, WA (US); Kunal Pandit, Maple Ridge (CA)

(73) Assignee: Amazon Technologies, Inc., Seattle, WA (US)

( * ) Notice: Subject to any disclaimer, the term of this patent is extended or adjusted under 35 U.S.C. 154(b) by 423 days.

(21) Appl. No.: 17/470,943

(22) Filed: Sep. 9, 2021

Related U.S. Application Data

(60) Provisional application No. 63/213,157, filed on Jun. 21, 2021.

(51) Int. Cl.
  *H04L 9/40* (2022.01)
  *H04L 41/0816* (2022.01)
  *H04L 41/0853* (2022.01)

(52) U.S. Cl.
  CPC ...... *H04L 63/0263* (2013.01); *H04L 41/0816* (2013.01); *H04L 41/0853* (2013.01); *H04L 63/0236* (2013.01); *H04L 63/20* (2013.01)

(58) Field of Classification Search
  CPC ............. H04L 63/0263; H04L 41/0816; H04L 41/0853; H04L 63/0236; H04L 63/20
  (Continued)

(56) References Cited

U.S. PATENT DOCUMENTS

2004/0264481 A1* 12/2004 Darling ............... H04L 67/1017
  370/395.2
2015/0326532 A1* 11/2015 Grant ..................... H04L 67/10
  726/1

(Continued)

FOREIGN PATENT DOCUMENTS

EP         3654220 A1 *  5/2020  ........... G06F 21/577
WO  WO-2020180761 A1 *  9/2020  ......... H04L 63/0227

OTHER PUBLICATIONS

Justine Sherry, et al., "Making Middleboxes Someone Else's Problem: Network Processing as a Cloud Service", ACM, SIGCOMM'12, Aug. 13-17, 2012, Helsinki, Finland, pp. 1-12.
(Continued)

*Primary Examiner* — Bryan F Wright
(74) *Attorney, Agent, or Firm* — S. Scott Foster; Kowert, Hood, Munyon, Rankin & Goetzel, P.C.

(57) ABSTRACT

A firewall manager automates traffic route configuration, compliance monitoring, and remediation. An administrator specifies a firewall policy that includes rules and traffic description, and specifies accounts, isolated virtual networks (IVNs) and/or subnets for firewall deployment. For automated traffic route configuration, the manager provisions and configures firewalls for the specified networks. The manager uses discovered network resource of the specified networks to determine route information for the firewalls for the networks for the traffic, and sends instructions for routing updates for the IVNs to an IVN manager service. For compliance monitoring and remediation, the manager obtains information about new IVNs, subnets, resources and/or routes, and determines compliance by comparing the obtained information to the firewall policy. The manager generates a remediation plan for non-compliance and
(Continued)

instructs remediation by performing programmatic calls to the IVN manager service.

20 Claims, 12 Drawing Sheets

(58) Field of Classification Search
USPC .......................................................... 726/11
See application file for complete search history.

(56) References Cited

U.S. PATENT DOCUMENTS

| | | | |
|---|---|---|---|
| 2016/0359692 A1* | 12/2016 | Iszlai | H04L 41/122 |
| 2018/0337858 A1* | 11/2018 | Yang | H04L 63/0254 |
| 2020/0304469 A1* | 9/2020 | Reimer | H04L 12/2898 |
| 2021/0051178 A1* | 2/2021 | Kuppannan | H04L 63/20 |

OTHER PUBLICATIONS

Justine Marie Sherry, "Middleboxes as a Cloud Service", Dissertation for Doctor of Philosophy in Computer Science in the Graduate Division University of California, 2016, pp. 1-115.

* cited by examiner

Describe policy

Policy details

Name

Region ▼

Firewall policy configuration

▲ Move up | ▼ Move down | Delete | Add rule groups

Priority | Name | Capacity

Choose Add rules groups to add rule groups to the policy.

Default actions
Action to take on packets that don't match any rules.

Choose how to treat fragmented packets
● Use the same actions for all packets
○ Use different actions for full packets and fragmented packets Action
● Forward to rule groups
○ Allow
○ Block Custom actions - optional
☐ Enable

*FIG. 5A*

Describe policy: Add rule groups

▼ Your rule groups
These are rule groups that you created.

| Name | Rule capacity | Action |
|---|---|---|
| Rule group 1<br>Rule group to allow requests to all corporate IPs | 700 | ● Add to firewall policy |
| Rule group 2<br>Blocked IP list across the organization | 700 | ● Add to firewall policy |
| Rule group 3<br>Embargoed countries | 700 | ○ Add to firewall policy |

▲ Managed rule groups

Cancel | Add rule groups

FIG. 5B

Describe policy route configurations

Firewall route configuration
Route management
○ Off
○ Monitor
◉ Monitor and Auto-Enforce Routes
   ☑ Review route changes before enforcing ▼ Traffic Type
These are the traffic endpoints to route traffic through for firewall inspection

| Name | Action |
|---|---|
| Internet Gateway (IGW) | ⬤▸ Add to firewall policy |
| NAT Gateway (NAT-GW) and Internet Gateway (IGW) | ◂⬤ Add to firewall policy |
| Virtual Gateway (VGW) | ⬤▸ Add to firewall policy |
| Inter-subnet | ⬤▸ Add to firewall policy |

Cancel | Previous | Next

FIG. 5C

Describe policy scope

Policy scope

Provider accounts affected by this policy

- ● Include all accounts
- ○ Include only the specified accounts.
- ○ Exclude the specified accounts and include all others.

Resource type

VPCs

Resources

- ● Include all resources that match the selected resource type.
- ○ Include only resources that have all the specified resource tags.
- ○ Exclude resources that have all the specified resource tags, and include all other resources.

Cancel | Previous | Next

*FIG. 5D*

GENERATING A PLAN FOR ROUTING UPDATES FOR DISCOVERED RESOURCES AT NETWORKS WITH DEPLOYED FIREWALLS

BACKGROUND

This application claims benefit of priority to U.S. Provisional Application Ser. No. 63/213,157, entitled "NETWORK FIREWALL TRAFFIC ROUTE CONFIGURATION, COMPLIANCE MONITORING, AND REMEDIATION," filed Jun. 21, 2021, and which is hereby incorporated herein by reference in its entirety.

Isolated virtual networks are used in the context of network-based service provider infrastructure as a service, and otherwise. In this context, the infrastructure provider, providing the underlying public network infrastructure, and the provider realizing the isolated virtual network (IVN) service over this infrastructure, may be different vendors.

In some such networks, security administrators separately configure (in a manual process) routes for their IVNs to direct traffic through a firewall. The effort required can be quite large as new accounts and IVNs are continuously added (e.g., IVNs can number in the hundreds or more for a client of a service provider) and security administrators find it hard to keep up with the ever-changing state of the environment. Security administrators would rather focus on their core responsibility of writing firewall rules and securing workloads.

BRIEF DESCRIPTION OF THE DRAWINGS

FIGS. 5A-5D are illustrations of a firewall manager interface in a system that implements traffic route configuration and remediation for network firewalls, according to some embodiments.

Figure 1:
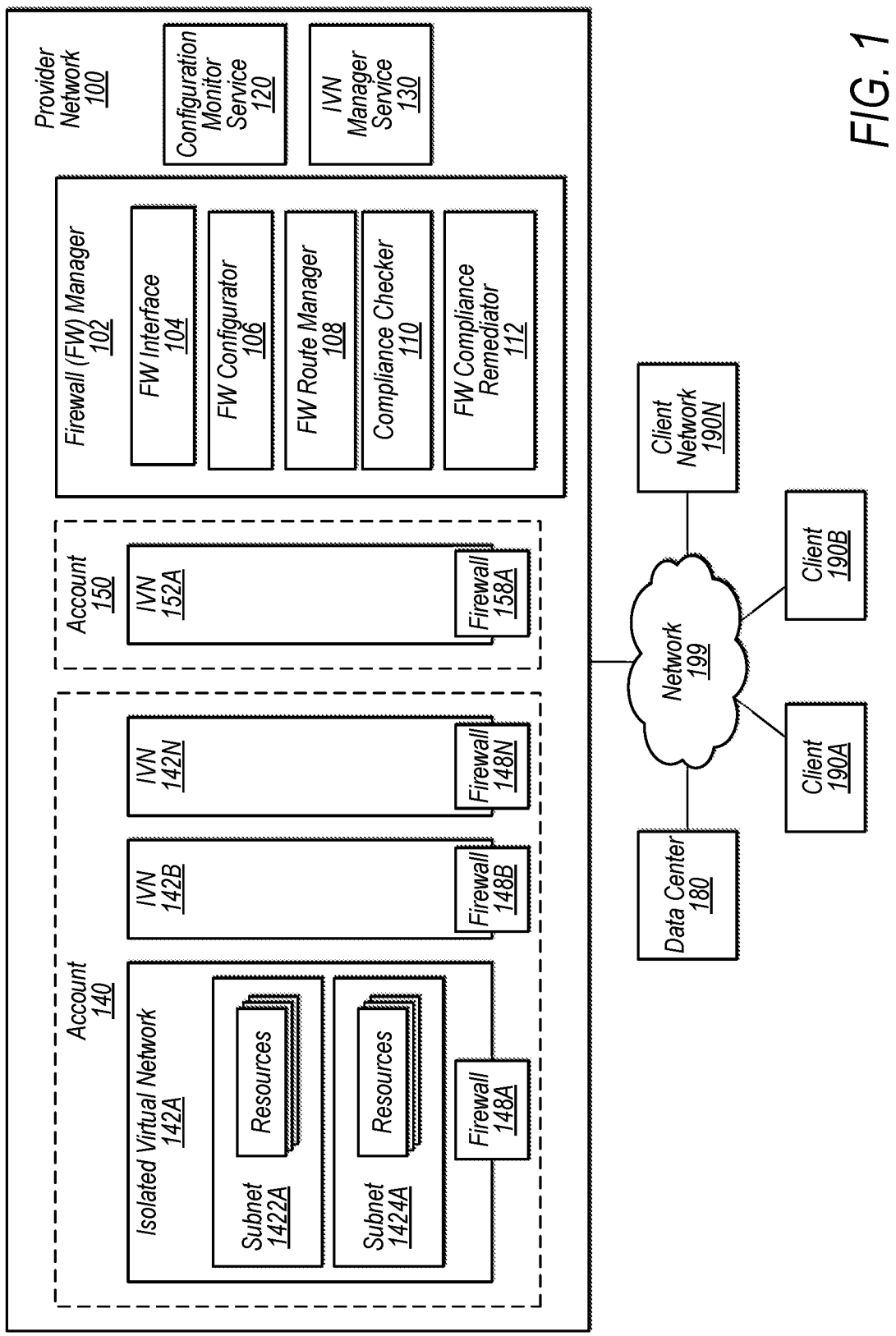
FIG. 1 is a block diagram that illustrates components of a system that implements traffic route configuration and remediation for network firewalls, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed below, various embodiments of systems that implement traffic route configuration and remediation for network firewalls are disclosed. In some systems, a security administrator deploys network firewall endpoints across accounts by separately configuring automation templates manually to route traffic through these endpoints. Such effort, required to set up routes, does not scale well as security administrators often need to keep up with the dynamic changes in their environment and monitor for any gaps in their security posture (a security posture of an organization may be captured in the rules of a security policy, in some embodiments).

Disclosed are embodiments of a system that automates portions of traffic route configuration of firewalls, automates monitoring for non-compliance with a security posture, and/or automates remediation of non-compliance. In a particular example, an administrator specifies a firewall policy that includes rules and a traffic description, and specifies accounts, isolated virtual networks (IVNs) and/or subnets for firewall deployment. For automated traffic route configuration, a firewall (FW) manager (e.g., of a network firewall service or the like) provisions and configures firewalls for the specified networks. The FW manager discovers network resources by making calls (the calls based on the specified accounts, isolated virtual networks (IVNs) and/or subnets for firewall deployment) to a configuration monitoring service. The FW manager applies the firewall policy to the discovered network resources of the specified networks to determine route information for the firewalls for the networks for the traffic, and sends instructions for routing updates for the IVNs to an IVN manager service. For compliance monitoring and remediation, the manager obtains information about new IVNs, new subnets, new resources and/or routes (again, from the configuration monitoring service) or obtains changes to IVNs, subnets, resource and/or routes, and determines compliance by comparing the obtained information to the firewall policy. The manager generates a remediation plan for non-compliance and instructs remediation by performing programmatic calls to the IVN manager service, in some embodiments.

For some embodiments disclosed herein, customers benefit from a system that can make routing intuitive and more accurate, shortening the time required for security administrators to set up firewalls, for example. Another benefit, in some embodiments, is a single, unified place from where security administrators can automatically set up routes when instantiating a firewall (e.g., a network firewall) across IVNs (IVNs are sometimes referred to as virtual private clouds (VPCs)) in their organization, reducing the overall time to deploy and operationalize the firewalls.

For example, a security administrator may be entrusted with defining rules and propagating the rules across their organization. A security administrator may rely on networking and DevOps teams to create the global networking infrastructure including the IVNs, subnets and the relevant traffic endpoints. However, deployment of security related features like a network firewall may require a dedicated subnet and endpoint along with route configuration changes, features that may not always fall under the purview of network team. In such cases, a security administrator can either task network teams with these needs, or manually set it up themselves. In some systems, security administrators do not have global visibility into how the routes are configured and whether they are misconfigured.

In at least some embodiments, user of the system (e.g., security administrators) benefit from the disclosed firewall manager's ability to monitor the routes for drifts (changes or additions that move the network(s) out of compliance), providing centralized visibility into any route configurations not compliant with a security posture. For example, some embodiments of the disclosed firewall manager automatically identify new subnets, IVNs, and accounts provisioned in the customer's organization, and modify routes accordingly, without requiring any manual intervention by an administrator.

In some embodiments, the system may provide information about route changes for display to security teams to review the route changes before applying them on their IVNs, providing additional flexibility to assess the impact of the changes before enforcement.

Figure 2A:
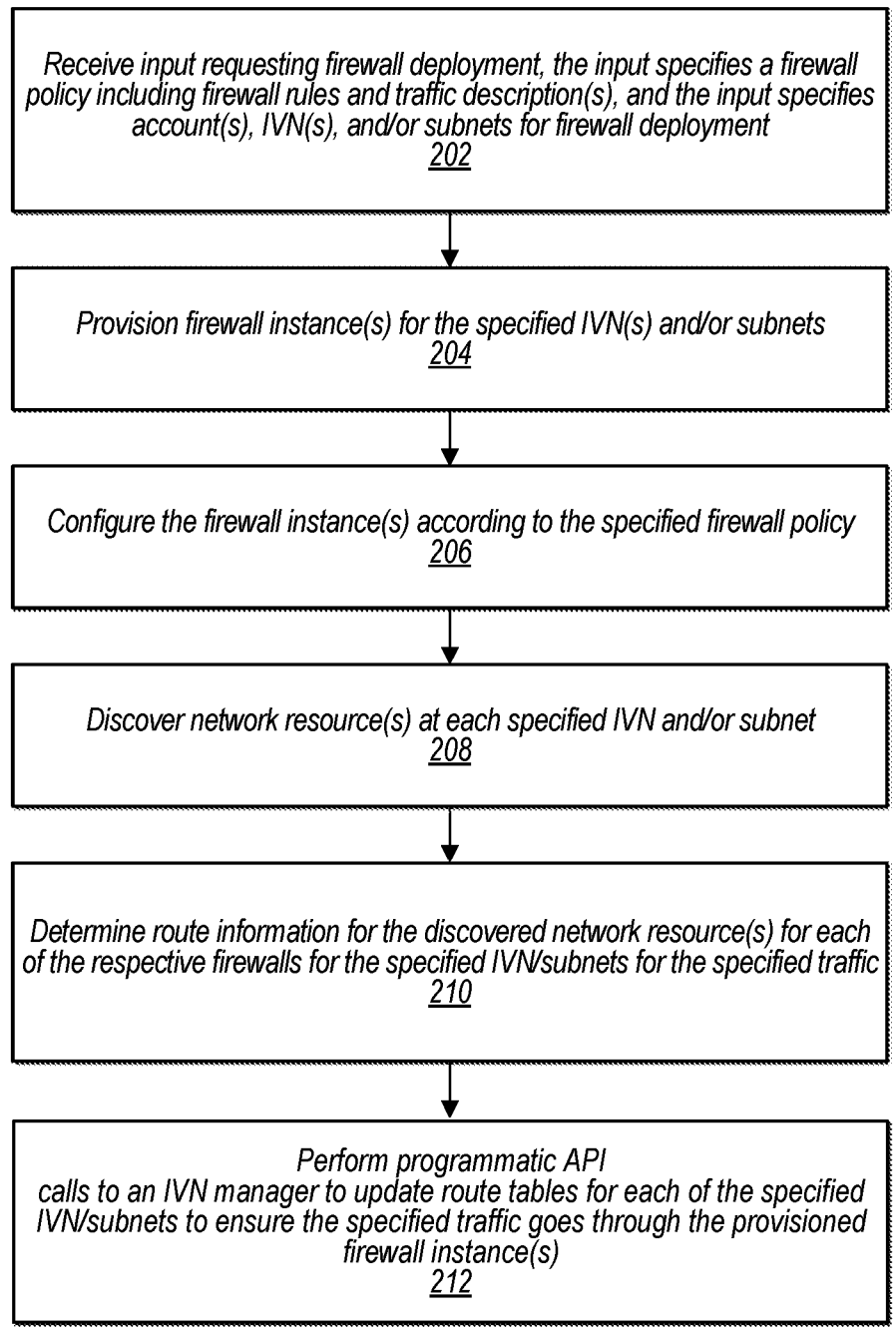
FIG. 2A is a process chart illustrating a process that implements traffic route configuration for network firewalls, according to some embodiments.
Figure 2B:
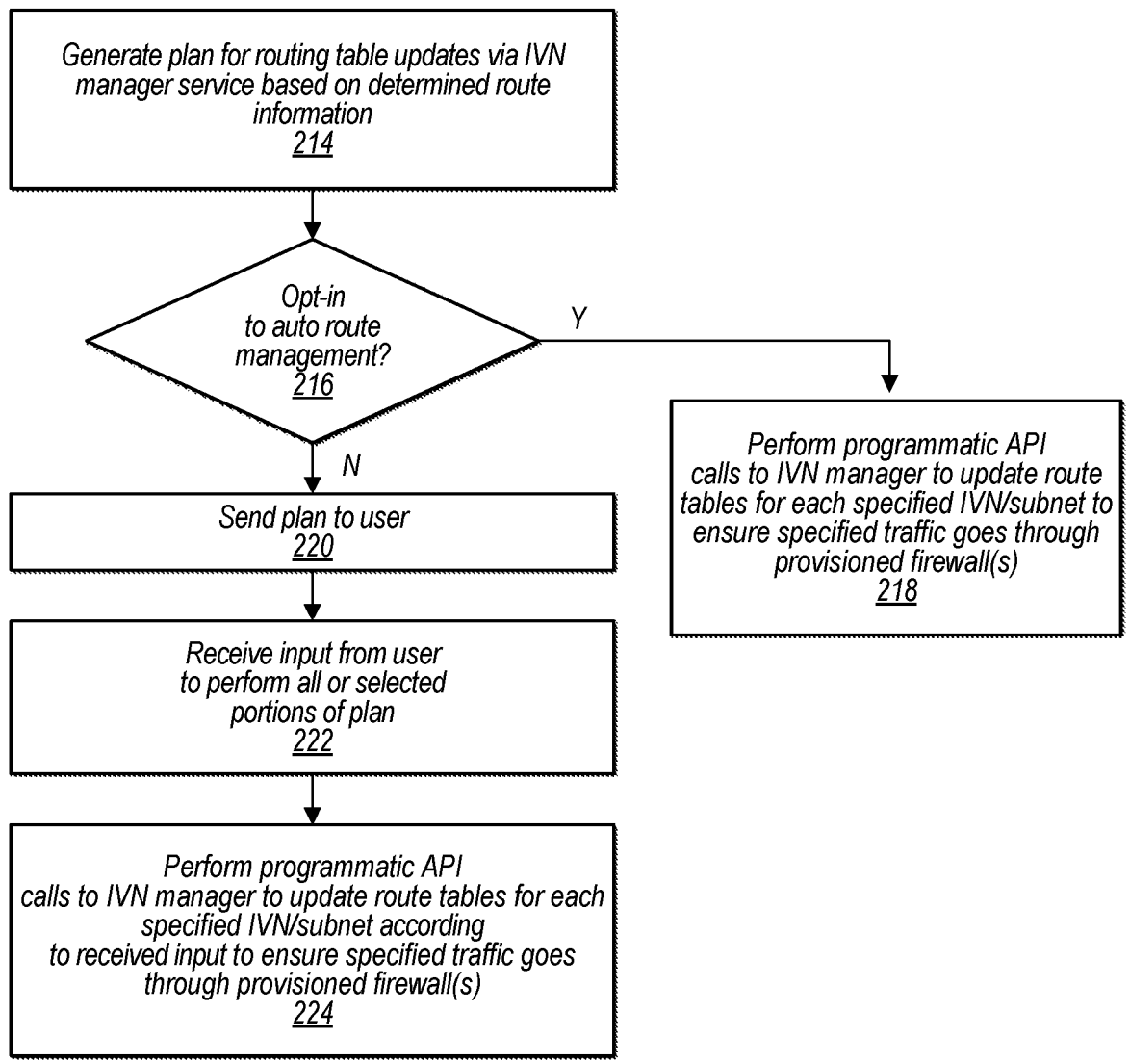
FIG. 2B is a process chart illustrating a process that implements traffic route configuration for network firewalls, according to some embodiments.
Figure 3:
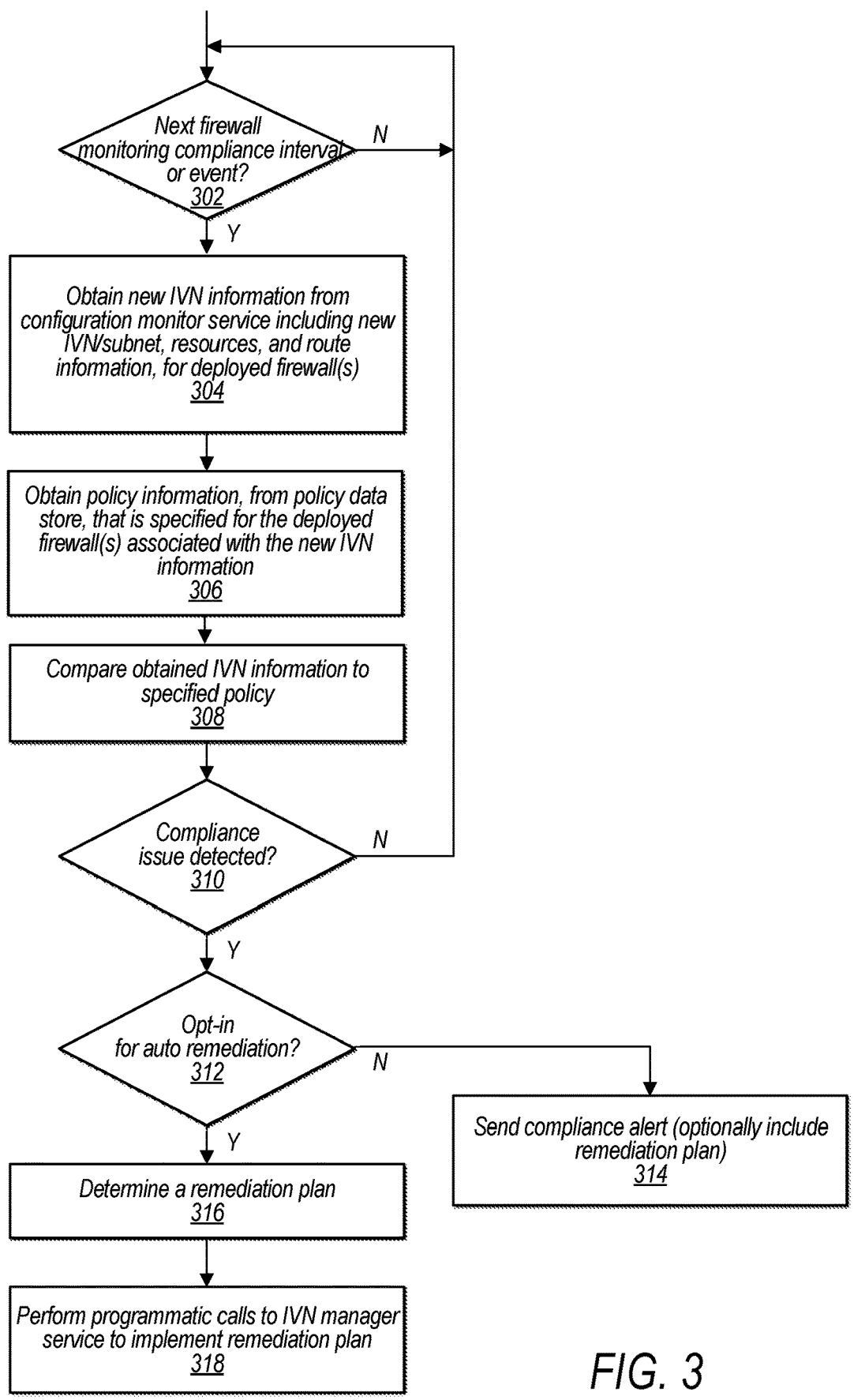
FIG. 3 is a process chart illustrating a process that implements monitoring and remediation for a system that implements traffic route configuration and remediation for network firewalls, according to some embodiments.
Figure 4A:
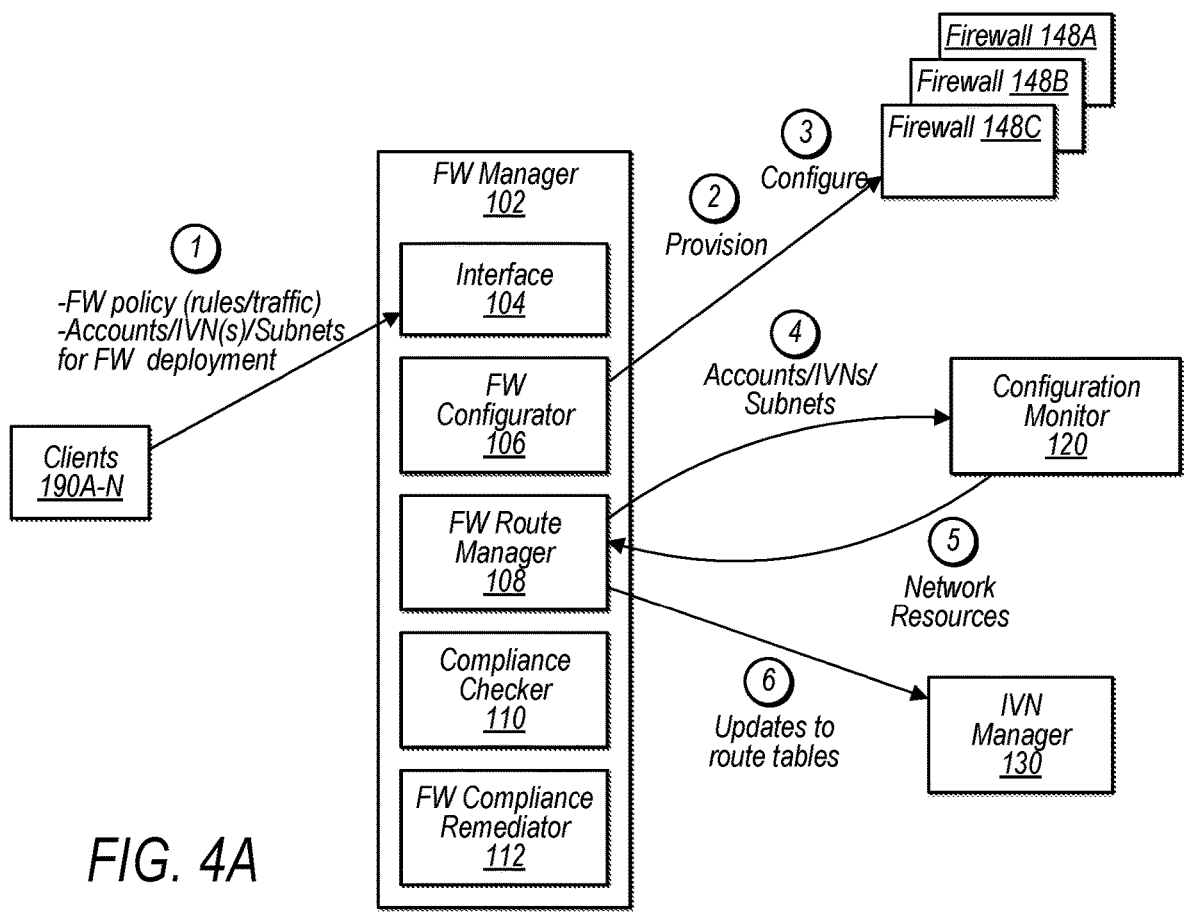
FIGS. 4A and 4B are data flow diagrams illustrating flows of data among components in a system that implements traffic route configuration and remediation for network firewalls, according to some embodiments.
Figure 4B:
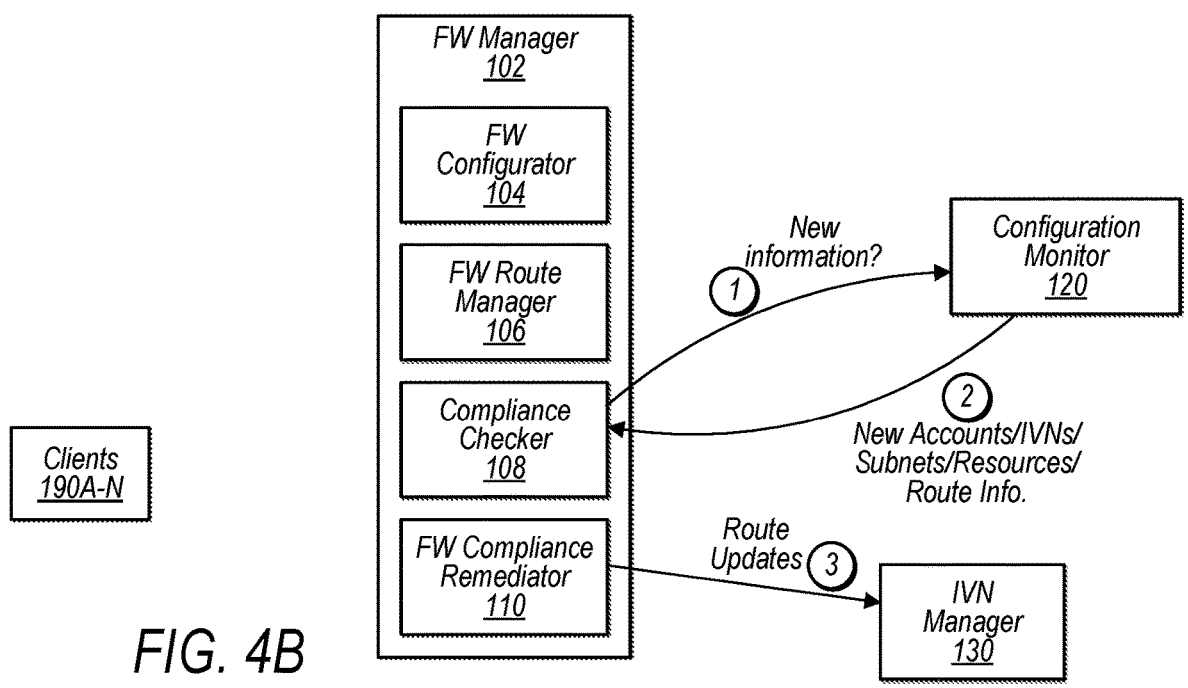

FIGS. 1, 5A-5D, 6A-6D, and 7 are block diagrams illustrating various embodiments of architectures of components of a system that implements network firewall traffic route configuration, compliance monitoring, and remediation. FIGS. 2A-2B and 3 are process diagrams that illustrate various functionality that may be performed by various of the components illustrated in block diagrams 1, 5A-5D, 6A-6D, and 7. FIGS. 4A and 4B illustrate data flows among components of FIGS. 1, 5A-5D, 6A-6D, and 7.

Components illustrated in FIGS. 1, 5A-5D, 6A-6D, and 7 are described, below, as performing various aspects of the functionality illustrated in FIGS. 2A-2B, 3 and 4A-4B. Such examples are illustrative and non-limiting. For example, different components may perform different parts of the functionality, the functionality may be performed in different sequence than depicted, and/or some functionality may be omitted, in some embodiments, etc.

FIG. 1 is a block diagram that illustrates components of a system that implements traffic route configuration and remediation for network firewalls, according to some embodiments. In the illustrated embodiment, firewall manager 102 functions to provide network firewall traffic route configuration, compliance monitoring, and remediation for isolated virtual networks 142A, 142B, 142N, 152A of accounts 140, 150, etc. of service provider network 100. In the illustrated embodiment, administrators (e.g., security administrators or other uses, accessing the system via clients 190A, 190B, 190N, or via a data center 180, etc.) provide input to firewall manager 102 (e.g., via a firewall (FW) manager interface 104 such as a command line interface (CLI), graphical user interface (GUI), application program interface (API), console, dashboard, some combination thereof, or the like) and the firewall manager 102 interacts with configuration monitor service 120 and IVN manager service 130 and to discover network resources, determine route information for the discovered resources, and automatically update route tables accordingly. In some embodiments (not illustrated) the firewall manager 102 may interact with a firewall service hosted by the service provider network 100, to provision and configure the firewalls 148A-148N and 158A, for example.

In at least some embodiments, customers may be required to complete pre-requisites, including enabling the configuration monitoring service 120 and IVN manager service 130 across the customer accounts of service provider network 100, and then can access the FW manager service 102 through a firewall manager interface 104 (e.g., using the firewall manager administrator account for their organization). In embodiments, the configuration monitoring service 120 is a service, accessible via one or more APIs, that enable assessment, auditing, and evaluation of the configurations of resources.

In embodiments, the configuration monitoring service 120 monitors (continuously, periodically, or on an event-basis,) and records resource configurations and provides for automated evaluation of recorded configurations against desired configurations. In embodiments, configuration monitoring service 120 provides for review of changes in configurations and relationships between resources, supports deeper dives into detailed resource configuration histories, and facilitates determinations of overall compliance against the configurations specified in guidelines. In embodiments, the IVN manager service 130 is a service for launching resources in a logically isolated virtual network that can be defined. IVN manager service 130 provides for control over a virtual networking environment, including selection of an IP address range, creation of subnets, and configuration of route tables and network gateways. IVN manager service 130 can use both IPv4 and IPV6 for most resources in a virtual private cloud, in embodiments.

Input for the firewall manager policy may be received via the firewall manger interface 104. The input may include the policy name, a set of rules (e.g., stateful and/or stateless), the accounts and the IVNs (if pre-tagged) to include (or exclude) (e.g., see FIG. 5D, described below). The set of rules may be grouped as rule groups, and may be pre-created on the network firewall interface using a firewall manager administrator account (not illustrated).

The FW manager interface 104 may provide for selection of whether firewall manager 102 is to automatically set, and/or monitor, routes (e.g., see FIG. 5C, described below). If automation it not selected, configuration and monitoring of routes may be performed otherwise, such as by the customer security administrator or some third-party. If automated management of routes through firewall manager 102 is selected, the FW manager interface 104 may provide the option to either auto-enforce or simply monitor routes. In either case, the FW manager interface 104 may act as an interface for a client to identify the use case and the traffic endpoints relevant to the use case. For example, the FW manager interface 104 may provide interface elements for choosing to enforce routes for traffic by selecting the traffic endpoint internet gateway (IGW), with or without a network address translation gateway (NAT-GW). The FW manager interface 104 may provide for selecting more than one use cases at a time and may provide an option to review the changes before enforcing the route changes. The firewall manager 102 can then create the firewall policy, based upon the input and/or selections, in embodiments.

Once configured, the FW manager interface 104 may provide a view of the policy (e.g., on a dashboard along with the chosen route management option). The FW manager interface 104 may display (e.g., via a dashboard or the like) any non-compliant routes that are determined from the automated monitoring. If the auto-configuration option is selected, FW manager interface 104 may list the set of changes for to review and acceptance, via the interface.

In embodiments, the FW manager interface 104 provides for editing of an existing firewall manager policy to enable route management. Once configured, the firewall manager policy may be used to evaluate all the existing network components in the IVNs to enforce route changes. In some embodiments, one or more policies specify route automations for one or more use cases of a deployment. For example, a policy can specify routes for traffic egressing through an IGW to the Internet, and can also specify monitoring of traffic between subnets in each IVN.

For a centralized deployment, instructions may be made via the FW interface 104 for firewall manager 102 to deploy the network firewall (e.g., 148B) in a single data center for each IVN. If this option is chosen, firewall manager 102 may configure route entries on subnets across all data centers to point to the network firewall deployed in that single data center, incurring cross-data center traffic costs. If customers choose (e.g., via FW interface 104) to deploy the network firewall per data center (distributed deployment), firewall manager 102 may direct the route entries to the firewall endpoint deployed for that data center.

In embodiments, FW route manager 108 retrieves saved firewall policies from a data store and creates a rule for each member account in the policy scope (e.g., by calling a configuration API or otherwise). The rule may be used by FW route manager 108 to determine route information for network resources for a respective firewall for the specified IVN and/or subnets for the specified traffic. For example, FW route manager 108 may use the account(s), IVN(s) and/or subnet(s) specified in the input to make programmatic calls to configuration monitor service 120 to discover network resources, and then apply the rule to the discovered resources and/or specified traffic to determine route information for the discovered resources for each of the respective firewalls for the specified IVN and/or subnets for the specified traffic. The rule may also be used by compliance checker 110 to evaluate whether obtained IVN information complies (e.g., blocks 306/308 of FIG. 3), in embodiments.

FIG. 2A is a process chart illustrating a process that implements traffic route configuration for network firewalls, according to some embodiments. The functionality depicted in FIG. 2a may be performed by various of the components 104-112 of firewall manager 102, in embodiments.

At block 202, input is received that requests firewall deployment (e.g., as described above with regard to FW interface 104). The input specifies a firewall policy, including rules and traffic description. The input also specifies account(s), IVN(s), and/or subnets for firewall deployment, in the illustrated embodiment.

At block 204, firewall instances (e.g., firewall 148A, 148B, 148N, 158A) are provisioned for the specified IVN(s) and/or specified subnets, by FW configurator 106, for example. At block 206, the provisioned firewall instances are configured according to the specified policy, by FW configurator 106, for example.

Resources at each specified IVN and/or subnet are discovered (block 208), by FW route manager 108, for example. In some embodiments, FW route manager 108 may make calls to the configuration monitor service 120, based on the accounts, IVN(s) and/or subnets to request the resources corresponding to those accounts, IVN(s) and/or subnets. The FW route manager 108 may receive back the discovered resources from configuration monitor service 120.

At block 210, route information for the discovered resources for each respective firewall for specified IVN and/or subnets for specified traffic is determined, by FW route manager 108, for example. In some embodiments, FW route manager 108 may apply the rules from the FW policy to the discovered network resources for each of the respective firewalls for the specified IVN and/or subnets for the specified traffic to determine the route information.

At block 212, programmatic API calls to the IVN manager service 130 are performed to update route tables for each specified IVN and/or subnet to ensure specified traffic goes through the provisioned firewalls. FW route manager 108 may perform the programmatic API calls, for example. In embodiments, the FW route manager 108 performs the programmatic API calls without receiving input from a user that indicates the programmatic calls. In some embodiments, FW route manager 108 will make programmatic API calls to create a new route table for the subnet dedicated to the network firewall and for traffic endpoints (IGW, VGW). For subnets that exist within an IVN, FW route manager 108 may re-use existing route tables by make programmatic API calls to create route entries that point traffic to the network firewall in that IVN, in embodiments.

FIG. 2B is a process chart illustrating a process that implements traffic route configuration for network firewalls, according to some embodiments. The illustrated embodiment expands upon and provides alternatives to the functionality depicted in block 212 of FIG. 2A, in embodiments. The depicted functionality in FIG. 2B may be performed by various components of FW manager 102, in embodiments.

At block 214, a plan for route table updates is generated (e.g., by the FW route manager 108) based on the determined route information (e.g., the determined route information from block 210). For example, FW route manager 108 may apply the rules from the FW policy to the discovered network resources for each of the respective firewalls for the specified IVN and/or subnets for the specified traffic to determine the route information.

Block 216 illustrates that automated route management may be a configurable feature which may be opted-into (e.g., via FW interface 104). If the account (or IVN) is indicated as having opted-in (block 216, Y) to automated route management the FW route manager 108 may perform (block 218) programmatic API calls to the IVN manager service 130 to update route tables for each specified IVN and/or subnet (e.g., to ensure the specified traffic goes through the provisioned firewalls). In embodiments, the FW route manager 108 performs the programmatic API calls without receiving input from a user that indicates the programmatic calls.

If the account (or IVN, depending upon the granularity that the opt-in is applied in the system) is indicated as not opted-in to automated route management (block 216, N) the generated plan is transmitted to a device of the user (block 220). The user may then alter the plan or come up with a different plan that the user enters into the system (via FW interface 104). The FW interface 104 receives the input, via a device of the user, to perform all or selected portions of the plan. For example, in some embodiments, the FW interface 104 may present the plan as selectable or modifiable interface elements that the user selects or modifies to provide the input. The FW interface 104 may receive input from a device of a user to perform all or selected portions of the plan (block 222). At block 224, the FW route manager 108 performs programmatic API calls to the IVN manager 130 to update route tables for each specified IVN and/or subnet according to the received input (e.g., to ensure the specified traffic goes through the provisioned firewalls). In embodiments, the FW route manager 108 performs the programmatic API calls without receiving input from a user that indicates the programmatic calls.

FIG. 3 is a process chart illustrating a process that implements monitoring and remediation for a system that implements traffic route configuration and remediation for network firewalls, according to some embodiments. Various of the functionality depicted in FIG. 3 may be performed by components of firewall manager 102, in embodiments.

The scope of monitoring and/or remediation may be performed at various levels of granularity. For example, monitoring may be performed on an account basis where all firewalls for an account are monitored for a firewall monitoring compliance interval or event. Non-exhaustive examples of events include "drifts" (e.g., changes (out-of-band changes made to the enforced routes) or additions (out-of-band additions made to the enforced routes) that might result in a compromised security posture such as non-compliant traffic flows) such as routing changes, route configurations not compliant with their security posture, additions of resources, rerouting of traffic, In another example, monitoring and/or remediation may be performed on an IVN-by-IVN basis at respective firewall compliance intervals or events for the deployed firewalls. In another example, monitoring and/or remediation may be performed on a firewall-by-firewall basis at respective firewall compliance intervals or events.

In some embodiments, the FW manager 102 may perform monitoring based on some trigger, the trigger may be based on time, such as a monitoring time interval for example or based on some event. In embodiments, an event may include notification of a new IVN, new subnet, new resource or new route, or changes for an IVN, subnet, resource or route, for example. It is contemplated that monitoring may be triggered otherwise, in various embodiments. At block 302, the system (e.g., the compliance checker 110) determines if a next firewall monitoring compliance interval has been reached or a triggering event has happened. If not (block 302, N) the system continues to wait for the next monitoring interval or event. If the next monitoring interval has been reached or event has happened (block 302, Y) new IVN information is obtained (e.g., by compliance checker 110) from the configuration monitoring service 120 (block 304). The information may include new IVN and/or subnet information, new resource information, and/or new route information, for the deployed firewalls, for example.

At block 304, policy information specified for the deployed firewalls is obtained, from a policy data store, for the deployed firewalls associated with the new IVN information. At block 306 policy information, from a policy data store, that is specified for the deployed firewall(s) associated with the new IVN information, is obtained.

The obtained IVN and/or subnets, new resources, and/or new route information is compared (block 308) to the specified policy, by compliance checker 110 for example. If no compliance issues are detected (block 310, N) the process returns to wait for the next monitoring interval (block 302). If compliance issues are detected (block 310 Y) the system determines whether there has been an opt-in for automated remediation (block 312). If there was an opt-in (block 312, Y) a remediation plan is determined (block 316, by FW compliance remediator 112) and programmatic calls to the IVN manager service 130 are performed to implement the remediation plan (e.g., by FW compliance remediator 112) (block 318). In embodiments, the FW compliance remediator 112 performs the programmatic API calls without receiving input from a user that indicates the programmatic calls. If there was no opt-in (block 312, N) the compliance checker 110 may send a compliance alert (block 314). The compliance alert may include a remediation plan, in some embodiments.

FIGS. 4A and 4B are data flow diagrams illustrating flows of data among components in a system that implements traffic route configuration and remediation for network firewalls, according to some embodiments. FIG. 4A illustrates data flows associated with automated firewall configuration (e.g., associated with the process illustrated in FIGS. 2A, 2B). FIG. 4a illustrates that at "1" a firewall manager interface 104 receives a firewall policy that specifies rules and traffic and also receives some indication of the networks associated with the policy, such as account(s), IVN(s), subnet(s) for firewall deployment. At "2" the FW configurator 106 uses the received information in "1" to provision firewalls 148A, B, C. At "3" the FW configurator 106 configures the firewalls, based at least in part on information obtained by the FW configurator 106 from the IVN manager service 130 (sometimes referred to as the IVN control plane) in embodiments.

In some embodiments, FW configurator 106 may directly provision and configure the firewalls. In some embodiments, FW configurator 106 may make programmatic API calls to a firewall service (e.g., a firewall service hosted by a service provider 100) to instruct provisioning and configuration of the firewalls.

At "4" the FW route manager 108 sends API-based requests for information about the resources on the networks/subnets or for the accounts specified in "1", and the configuration monitor service 120 responds with information (e.g., addressees, etc.) about the network resources at "5". At "6" the FW route manager 108 makes API calls to the IVN manager service 130 to update existing route entries and/or create now routing entries.

FIG. 4B illustrates data flows associated with automated firewall monitoring and route remediation (e.g., associated with the process illustrated in FIG. 3). At "1" a compliance checker requests (at intervals) new information from configuration monitor service 120, and at "2" the configuration monitor service 120 provides any information about new accounts, IVNs, subnets, resources, route information, or changes thereto. The compliance checker 110 applies the appropriate policy to the new information to determine compliance, and if non-compliant, determines route updates (again, in accordance with the firewall policy(s)) and makes programmatic calls to the IVN manager service 130 to implement the route updates.

FIGS. 5A-5D are illustrations of a firewall manager interface in a system that implements traffic route configuration and remediation for network firewalls, according to some embodiments. FIGS. 5A-5D illustrate a GUI version of FW interface 104, with selectable user interface elements and text entry boxes that receive input from users.

FIGS. 5A-5D illustrate steps for specifying data for policies (e.g., policy type, policy scope, policy tags, policy review and creation FIG. 5A illustrates a GUI for entering a description of a firewall policy. In the illustrated example, interface elements for entering a policy name and region are provided. Features, such as region, may be selectable options that have been pre-configured by an admin with privileges to create such pre-configured options for selection across the FW interface 104. Lower in the illustration, user interface elements for firewall policy configuration are depicted. User interface elements for adding and deleting stateless and/or stateful rule groups are depicted. In FIG. 5B, more user interface elements for describing a policy, such as adding stateless rule groups, and managing rule groups, are depicted.

In FIG. 5C, user interface elements for describing policy route configurations are depicted. The top half of the illustration depicts selectable configuration options for whether to opt-in or opt-out of monitoring routes and/or auto-enforcing routes. "Off", "Monitor", "Monitor and Auto-Enforce" and "Review route changes before enforcing" selectable interface elements are depicted. For a system configured according to selection of the "Off" interface element, the firewall manager will not update or monitor routes for IVNs to route them through the firewall endpoints created by this security policy. For a system configured according to selection of the "Monitor" interface element, firewall manager will monitor and alert on the routes that need to be enforced to direct traffic through the respective firewall endpoint, created by the security policy. For a system configured according to selection of the "Monitor and Auto-Enforce Routes" interface element, firewall manager will update route tables in the IVNs scoped in this policy to add entries to direct traffic to the respective firewall endpoint. Any subsequent changes to those entries will be monitored and alerted on, in at least the illustrated embodiment. In the illustrated system, an interface element may be selected to configure the system to display the route changes for review and/or selection prior to enforcement, and the system configured to act accordingly.

For some embodiments, for creating a firewall endpoint in the IVNs, traffic must be routed through the firewall endpoints to do the detection and mitigation. For input selecting the remediate option, the firewall manager 102 will update the route tables to send traffic (e.g., via IGW or VGW, if applicable) through the firewall endpoint created by the corresponding policy, in embodiments.

The bottom half of the 5C illustration depicts selectable interface elements for specifying traffic types and types of gateways. FIG. 5C illustrates that various gateways may be added to the firewall policy. Selection of an IGW may configure routes for traffic egressing from subnets to the IGW, and for traffic destined to subnets from IGW, including a NAT Gateway (NAT-GW), for example. Selection of a NAT Gateway may configure routes for traffic egressing from private subnets to NAT Gateway to IGW, and for traffic destined for private subnets from IGW, through NAT-GW. Selection of the virtual gateway may configure routes for traffic egressing from subnets to VGW, and for traffic destined for subnets from VGW, and selection of inter-subnet configure routes for traffic between subnets in the same VPC.

FIG. 5D illustrates user-selectable interface elements for specifying a scope of the policy with regard to particular accounts and resources.

Deployment Models

In a distributed deployment model, customers deploy a firewall for every IVN in their accounts. An example use case is to circumvent single points of failure by having a separate endpoint deployed per IVN. In this model, routing may need to be done for both ingress and egress traffic for each IVN, by configuring routes to direct traffic between every subnet and the respective endpoints (IGW, NAT-GW, VGW, IVN Endpoints), through the network firewall endpoint.

In a centralized deployment model, the network firewall endpoint can be deployed in a single IVN connected to a transit gateway (TGW). In this case, the IVN serves as a central inspection IVN for monitoring traffic across multiple IVNs and accounts within a region. In some embodiments, routes need to be enabled for TGW route domains and for spoke IVNs to direct their traffic to the central inspection IVN for traffic inspection.

Use Cases

Figure 6C:
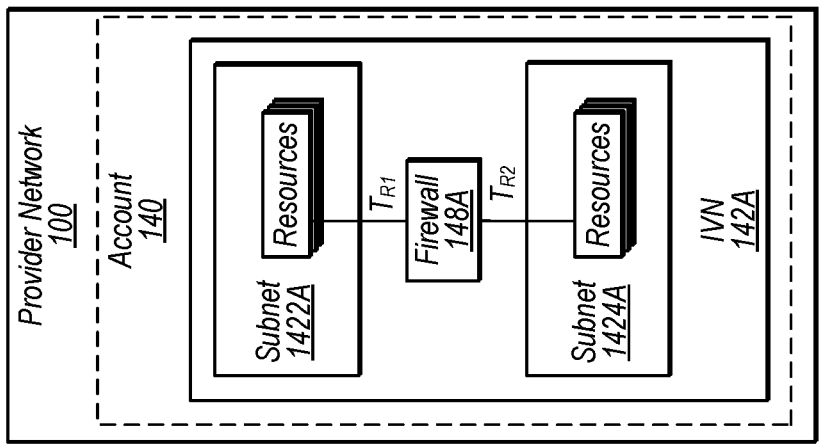
FIGS. 6A, 6B, 6C and 6D are block diagrams of various system architectures of networks in a system that implements traffic route configuration and remediation for network firewalls having traffic flows, according to some embodiments.
Figure 6B:
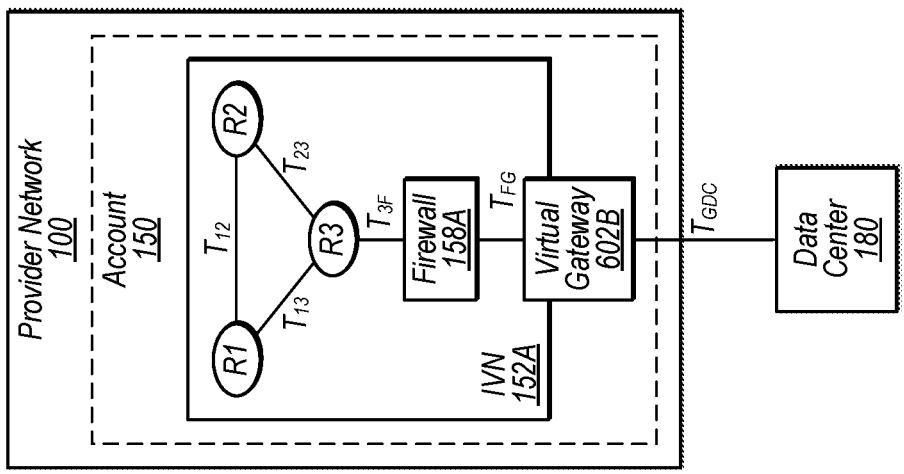
Figure 6A:
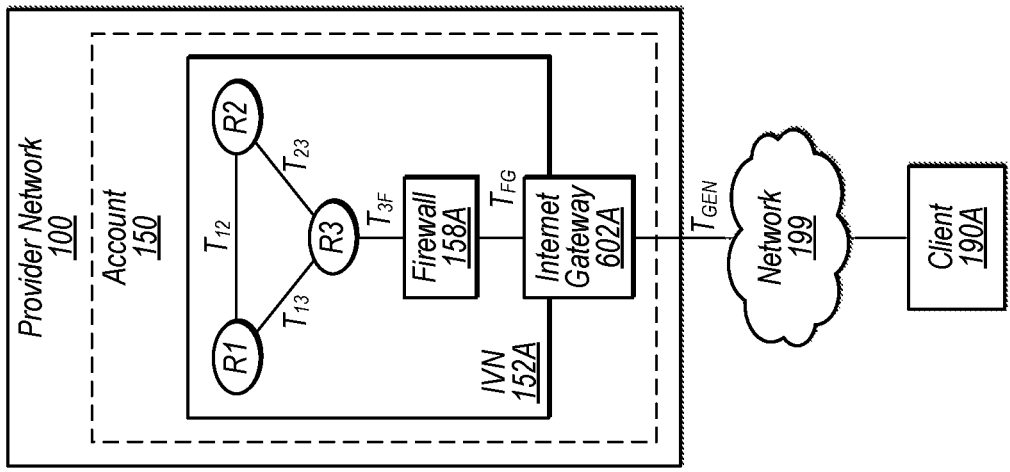

FIGS. 6A, 6B, 6C and 6D are block diagrams of various system architectures of networks in a system that implements traffic route configuration and remediation for network firewalls having traffic flows, according to some embodiments. FIGS. 6A-6C are examples of a distributed deployment model where multiple firewalls are distributed throughout the network for a client, each IVN of an account having a respective firewall. FIG. 6A illustrates an example use case of routing traffic between an IVN and an external network through firewall 158A. In the illustrated embodiment, a firewall 158A monitors traffic egressing (and ingressing) from/to the IVN 152A to the network 199 (e.g., the Internet, or a wide area network or the like) through Internet Gateway (IGW) 602A. The architecture may include a network address translation (NAT) Gateway (not illustrated) in some embodiments.

In the illustrated embodiment, traffic TFG/TGEN moves to/from the external network 199 from/to IVN 152A via the gateway 602A and passes through firewall 158A, in accordance with the firewall policy specified for the firewall 158A. In the illustrated embodiments, traffic $T_{12}$ is passed between resource R1 and resource R2, traffic $T_{13}$ is passed between resource R1 and resource R3 and traffic $T_{23}$ is passed between resource R2 and resource R3. The policy may specify whether traffic exiting and/or entering the IVN 152A passes through the firewall, in embodiments.

FIG. 6B illustrates another use case of routing traffic between an IVN to on-premises data center via Virtual Gateway (VGW) through firewall 158A. In the illustrated embodiment, the firewall 158A monitor traffic egressing (and ingressing) from/to IVN 152A to data center 180 through VGW 602B.

In the illustrated embodiment, traffic TFG/TGDC moves to/from the data center 180 from/to IVN 152A via the gateway 602B and passes through firewall 158A, in accordance with the firewall policy specified for the firewall 158A. In the illustrated embodiments, traffic $T_{12}$ is passed between resource R1 and resource R2, traffic $T_{13}$ is passed between resource R1 and resource R3 and traffic $T_{23}$ is passed between resource R2 and resource R3. The policy may specify whether traffic exiting and/or entering the IVN 152A passes through the firewall 158A, in embodiments.

FIG. 6C illustrates another use case of routing traffic between subnets (inter-subnet). In the illustrated embodiment, the firewall 148A monitors traffic flowing between resources of subnets 1422A, 1424A within IVN 142A. In embodiments, traffic may be routed via a firewall to monitor traffic between subnets and IVN endpoints (Gateway and Interface endpoints) within an IVN.

In the illustrated embodiment, traffic $T_{R1}/T_{R2}$ between various resources of subnet 1422A and subnet 1424A is routed through firewall 148A of IVN142A for account 140 of provider network 100.

Figure 6D:
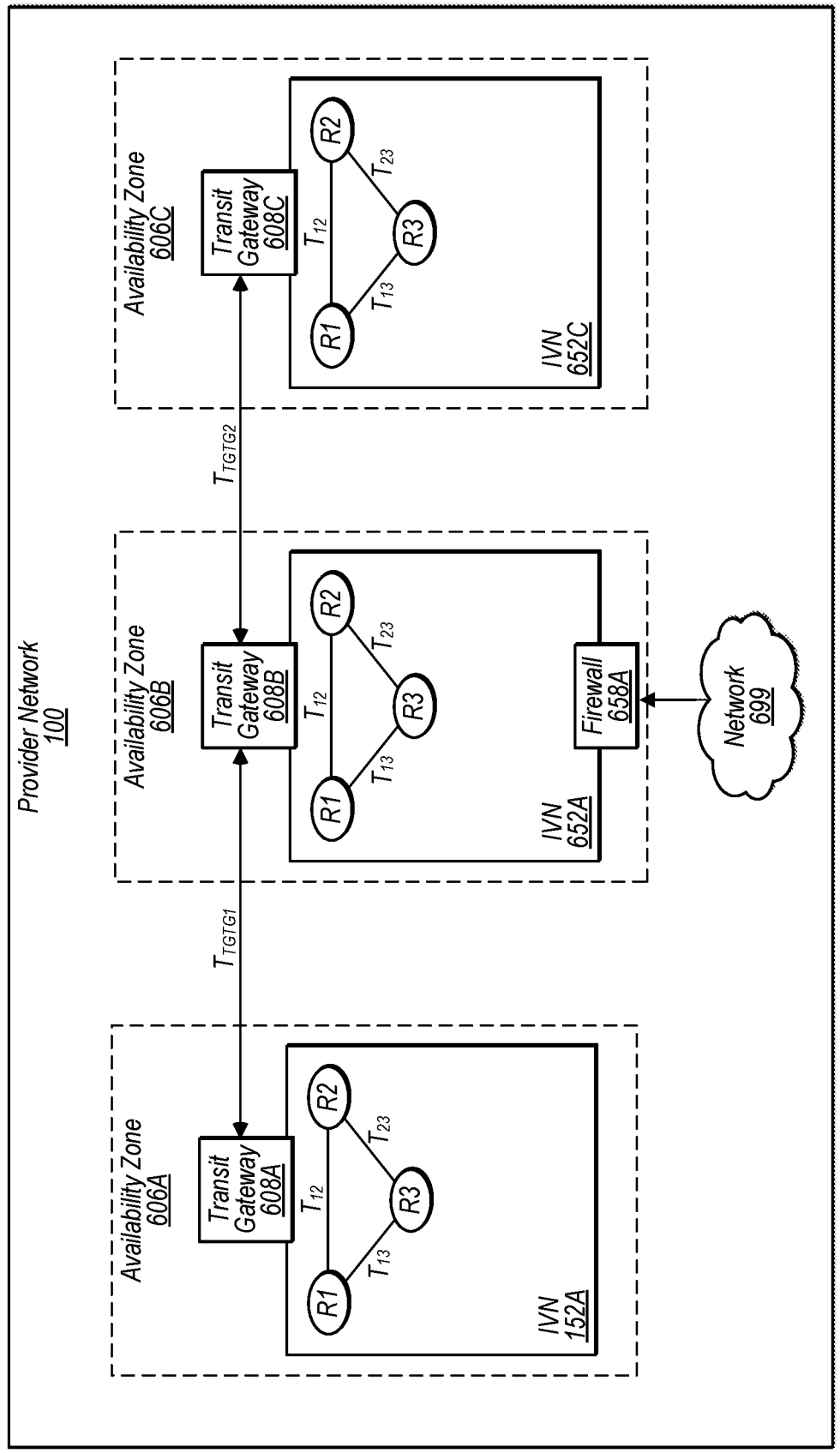

FIG. 6D illustrates an example of a centralized deployment model, where traffic is routed via a central firewall 658A in one IVN 652A that inspects traffic for multiple different IVNs 152A, 652A, 652C across an account, such as but not limited to for multiple IVNs in multiple availability zones 606A, 606B, 606C. In the illustrated embodiment, once traffic (traffic from a subnet network 699 of service provider network 100 or otherwise) has passed through firewall 658A of IVN 652A in availability zone 606B it may be distributed (e.g., via transit gateway 608B to either of the other IVNs 152A, or 652A). Other architectures are contemplated for the centralized deployment model. For example, in an architecture with two IVNs, one IVN may implement the firewall and traffic for the other IVN may be routed through the firewall and then routed to the other IVN via transit gateway. In another example architecture, a NAT gateway may enable workloads in private subnets from spoke IVNs to connect to external networks (e.g., Internet) or to provider services in public IP space. Other centralized deployment architectures are contemplated, such as a hub and spoke, for example, again leveraging a one-firewall-to-many IVNs design.

Configuration Options

The system may be configurable to monitor and automatically configure routes or to monitor routes only. When configured to only monitor routes, the system will generate and send alerts for any routes determined non-compliant with the respective security posture. For example, the system will generate and transmit alerts based on discovery of asymmetric routes or routes that bypass network firewall inspection. This configuration may be used to determine and provide assessments about coverage of route changes before rolling the route changes out. When configured to perform both monitor and auto-configure routes, the system may display changes for review and automatically configure routes for a network firewall, and the system may generate and transmit alerts to customers on any out-of-band changes to the created routes.

In embodiments, an interface of the firewall manager may be configured to list all the expected routes changes, allowing the security administrator to review and approve changes before enforcing them.

In embodiments, the system (e.g., the firewall manager 102) may be configured to monitor and enforce routes using policies. The system may only attempt to enforce rules on the newly discovered subnets and traffic endpoints for the accounts and IVNs in the policy's scope. In embodiments, the system may generate and transmit notifications of changes made to those routes, but the system will not revert the changes. For example, to maintain separation of responsibility between the network and security teams, the system may be configured to only alert the security administrator when the route entries are changed outside of the system (outside of the firewall manager) and do not comply with the expected route destination.

Example Computer System

Figure 7:
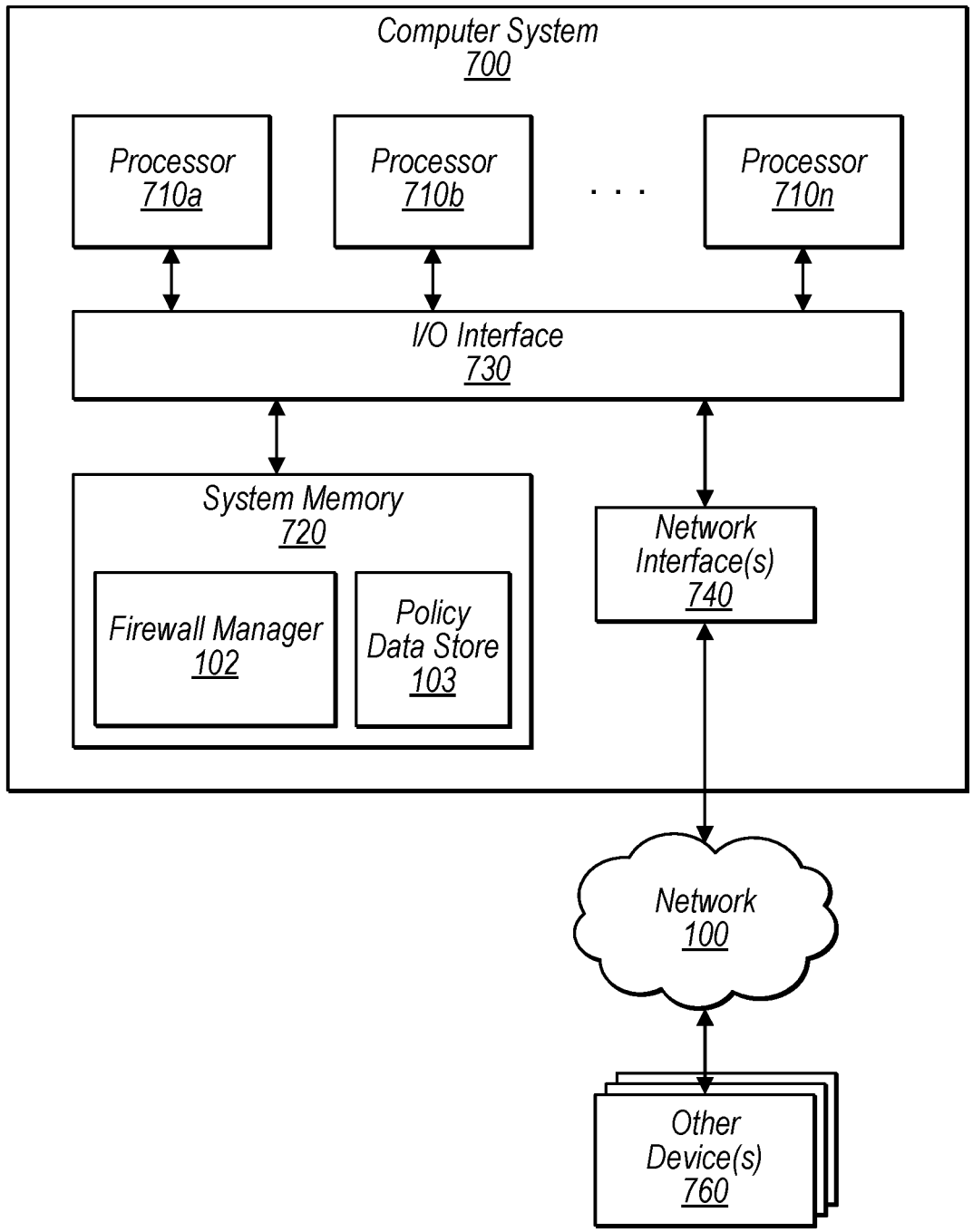
FIG. 7 is a block diagram illustrating a computer system configured to implement at least a portion of a system that implements traffic route configuration and remediation for network firewalls having traffic flows, according to some embodiments.

FIG. 7 is a block diagram that illustrates an example of a computer system, one or more of which may implement various components described and illustrated throughout the disclosure, including one or more components that implement traffic route configuration and remediation for network firewalls, according to embodiments.

Various portions of systems in FIGS. 1, 5A-5D, 6A-6D and 7 and/or methods presented in FIGS. 2A-2B and 3, as well as data flows illustrated in FIGS. 4A-4B described herein, may be executed on one or more computer systems similar to that described herein, which may interact with various other devices of the system.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 760, such as cursor control device, keyboard, audio device, and display(s). In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for an Identity and Access Management Service that implements persistent source values for assumed alternative identities may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for a system that implements traffic route configuration and remediation for network firewalls, are shown stored within system memory 720 as firewall manager 102 and policy data store 103, respectively. In embodiments, program instructions and/or data may be received, sent, or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network 199 or 100 and/or a wireless link, such as may be implemented via network interface 740. Program instructions may include instructions for implementing the techniques described with respect to any of the FIGS.

In some embodiments, I/O interface 730 may be configured to coordinate I/O traffic between processor 710, system memory 720, and any peripheral devices in the device, including network interface 740 or other peripheral interfaces, such as input/output devices. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 700 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 700. Multiple input/output devices may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Memory 720 may include program instructions (e.g., such as firewall manager 102), configured to implement embodiments of a system that implements traffic route configuration and remediation for network firewalls as described herein, and policy data store 103, comprising various data (e.g., firewall policies) accessible by the program instructions 102. In one embodiment, program instructions 102 may include software elements of a method illustrated in the above figures. Data store 103 may include data that may be used in embodiments described herein. In other embodiments, other or different software elements and/or data may be included.

Those skilled in the art will appreciate that computer system 700 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein (e.g., traffic route configuration and remediation for network firewalls) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The invention claimed is:

1. A system, comprising:
one or more computers comprising respective processors and memory and configured to:
receive input associated with a request for deployment of one or more firewalls for one or more isolated virtual networks (IVNs), wherein the input:
specifies a firewall policy including firewall rules and a traffic description, and
specifies one or more networks for deployment of the one or more firewalls;
provision and configure one or more firewall instances in accordance with the specified firewall policy for the specified one or more networks;
monitor for creation or update of resources specified via an interface for individual ones of the specified one or more networks to which the firewall policy should be applied;
based on the monitoring, discover resources at individual ones of the specified one or more networks that are specified to bypass inspection in non-compliance with the firewall policy to which the firewall policy is to be applied after discovery;
determine route information for the discovered resources for individual ones of respective firewalls for the specified one or more networks to ensure traffic identified by the traffic description goes through the provisioned one or more firewalls; and
transmit, over a network, programmatic API calls to an IVN manager to update route tables for individual ones of the specified one or more networks according to the determined route information, or
generate and transmit, over the network, a routing according to the determined route information.

2. The system of claim 1, wherein to discover the resources at the individual networks the respective processors and memory are configured to make API calls to a configuration monitor service to request the resources, the calls based on the specified one or more networks for deployment of the one or more firewalls, the specified one or more networks specified via account identifier, IVN identifier or subnet identifier.

3. The system of claim 1, wherein to determine the route information for the discovered resources for individual ones of respective firewalls the respective processors and memory are configured to apply the firewall rules from the firewall policy to the discovered network resources for each of the respective firewalls.

4. The system of claim 1, wherein the input that specifies the one or more networks for deployment of the one or more firewalls comprises one or more accounts, IVNs, or subnets for firewall deployment.

5. The system of claim 1, wherein:
said one or more computers comprising respective processors and memory are one or more computers of a service provider network that provides computing services to a plurality of customers;
said specified one or more networks for deployment of the one or more firewalls comprises IVNs or subnets of the service provider network;
said discovered resources are resources provided by the service provider network; and
said IVN manager is an IVN service provided by the service provider network.

6. A method, comprising:
performing, by one or more computing devices:
provisioning, based on a request to deploy one or more firewalls for traffic on one or more networks, one or more firewall instances in accordance with a firewall policy for the traffic on the one or more networks;
monitoring for creation or update of resources specified via an interface for individual ones of the specified one or more networks to which the firewall policy should be applied;
based on the monitoring, discovering resources at individual ones of the one or more networks that are specified to bypass inspection in non-compliance with the firewall policy to which the firewall policy is to be applied after discovery;
determining route information for the discovered resources for individual ones of respective firewalls for the one or more networks to ensure the traffic goes through the provisioned one or more firewalls; and
transmitting programmatic API calls to an IVN manager to update route tables for individual ones of the one or more networks according to the determined route information, or
generating and transmitting a routing plan according to the determined route information.

7. The method of claim 6, further comprising:
generating interface elements for receiving specification of the firewall policy comprising interface elements for specification of one or more firewall rules;
wherein said determining route information is based at least in part on the one or more firewall rules received via the interface elements.

8. The method of claim 6, further comprising:
generating interface elements for receiving specification of the traffic on the one or more networks;
wherein said determining route information to ensure the traffic goes through the provisioned one or more firewalls is based at least in part on the traffic specified via the interface elements.

9. The method of claim 6, further comprising:
generating interface elements for receiving input that specifies one or more accounts, one or more IVNs, or one of more subnets for firewall deployment;
wherein said provisioning the one or more firewall instances comprises provisioning a different one of the firewall instance for individual ones of the one or more accounts, the one or more IVNs, or the one of more subnets.

10. The method of claim 6, comprising:
performing said provisioning, discovering, determining, and transmitting by a firewall manager service hosted by a service provider network that provides compute and network services to a plurality of clients;
wherein said transmitting programmatic API calls to the IVN manager comprises transmitting the programmatic API calls to an IVN manager service hosted by the service provider network.

11. The method of claim 6, further comprising:
configuring, based at least in part on network address information obtained from the IVN manager, the one or more firewall instances according to the firewall policy.

12. The method of claim 6, wherein:
said provisioning, said discovering, and said determining are performed for a first firewall monitoring interval or event;
the method further comprises, for a second firewall monitoring interval or event:
  monitoring for compliance of the discovered resources, wherein said monitoring comprises obtaining information about new resources or information about changes to route information; and
  comparing the obtained information to the firewall policy to determine whether the new resources or information about the changes to the route information complies with the firewall policy.

13. The method of claim 12, further comprising:
determining, for the second firewall monitoring interval or event, that at least one of the new resources or the information about the changes to the route information does not comply with the firewall policy;
determining, for the non-compliance, a remediation plan comprising route information to remediate the non-compliance; and
performing programmatic calls to the IVN manager to implement the remediation plan.

14. One or more non-transitory computer-readable storage media storing program instructions that when executed on or across one or more processors cause the one or more processors to perform:
  monitoring changes specified via an interface to resources of an account for compliance with a firewall policy, wherein said monitoring comprises:
    obtaining information about new resources for the account or information about changes to route information for the account;
    comparing the obtained information to the firewall policy to determine that the new resources bypass inspection in non-compliance with the firewall policy to determine that the changes specified via the interface are in non-compliance with the firewall policy; and
  remediating the non-compliance, wherein said remediation comprises:
    for one or more of the changes that do not comply with the firewall policy,
      determining a remediation plan comprising new route information to remediate the non-compliance with the firewall policy; and
      transmitting, over a network, programmatic API calls to an isolated virtual network (IVN) manager to update the route information with new route information, or
      transmitting, over the network, a non-compliance alert comprising the remediation plan.

15. The one or more non-transitory computer-readable media of claim 14,
wherein to perform said obtaining information the program instructions cause the one or more processors to perform obtaining new information from a configuration monitor service, wherein the new information comprises: information about a new IVN, new subnet, new resource or new route, or changes for an IVN, subnet, resource or route.

16. The one or more non-transitory computer-readable media of claim 14, wherein the program instructions cause the one or more processors to perform:
  monitoring for compliance of changes to networks or resources of another account;
  determining, based on a comparison of a policy for the other account to the changes to the resources or networks of the other account, that one or more of the changes is non-compliant;
  determining whether auto-remediation is specified for a firewall of the other account;
  if auto-remediation is specified, transmitting, over a network, programmatic API calls to an isolated virtual network (IVN) manager to update the route information with new route information for the firewall of the other account to remediate the non-compliance; and
  if auto-remediation is not specified, transmitting, over the network, a non-compliance alert comprising a routing plan to remediate the non-compliance.

17. The one or more non-transitory computer-readable media of claim 14,
wherein the program instructions cause the one or more processors to perform said monitoring, determining, and transmitting for a firewall monitoring compliance interval or event, the interval or event specified on an account-by-account basis wherein each account is associated with a respective interval or event, or on an IVN-by-IVN basis wherein each IVN is associated with a respective interval or event.

18. The one or more non-transitory computer-readable media of claim 14, wherein the program instructions cause the one or more processors to perform:
  generating selectable interface elements for specifying configuration of the firewall policy, wherein the selectable interface elements provide for specification of rules; and
  generating, based on input indicating selections via the selectable interface elements, the firewall policy.

19. The one or more non-transitory computer-readable media of claim 14, wherein the program instructions cause the one or more processors to perform:
  generating selectable interface elements for specifying management features of the firewall policy, wherein the selectable interface elements provide for opting-in or opting-out of automated route monitoring and opting-in or opting-out of automated rule enforcement, wherein automated rule enforcement comprises said transmitting the programmatic API calls to the IVN manager to update the route information with the new route information; and
  performing, based on input received via the selectable interface elements that indicates opting-in to the automated route monitoring and opting-in to the automated rule enforcement, said monitoring for compliance of changes to resources of the account and said transmitting the programmatic API calls to the IVN manager to update the route information with the new route information.

20. The one or more non-transitory computer-readable media of claim 14, wherein to perform said determining the remediation plan comprising the new route information the program instructions cause the one or more processors to perform:
  applying one or more rules from the firewall policy to the new IVN information for the non-compliance to determine new route information to route traffic associated with the non-compliance through the firewall associated with the firewall policy.

* * * * *